(12) United States Patent
Wang et al.

(10) Patent No.: US 12,167,226 B2
(45) Date of Patent: Dec. 10, 2024

(54) AUDIO SIGNAL PROCESSING METHOD, ELECTRONIC APPARATUS, AND STORAGE MEDIUM

(71) Applicant: Beijing Xiaomi Mobile Software Co., Ltd., Beijing (CN)

(72) Inventors: Kai Wang, Beijing (CN); Runyu Shi, Beijing (CN); Xueyang Lv, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 95 days.

(21) Appl. No.: 17/703,206

(22) Filed: Mar. 24, 2022

(65) Prior Publication Data

US 2023/0045721 A1 Feb. 9, 2023

(30) Foreign Application Priority Data

Aug. 6, 2021 (CN) .......................... 202110901591.X

(51) Int. Cl.
*H04S 7/00* (2006.01)
*H04R 5/033* (2006.01)
*H04R 5/04* (2006.01)
*H04W 4/80* (2018.01)

(52) U.S. Cl.
CPC ............. *H04S 7/304* (2013.01); *H04R 5/033* (2013.01); *H04R 5/04* (2013.01); *H04W 4/80* (2018.02); *H04S 2420/01* (2013.01)

(58) Field of Classification Search
CPC ..... H04S 7/304; H04S 2420/01; H04R 5/033; H04R 5/04; H04W 4/80
USPC .......... 381/300, 387, 386, 150, 74, 58, 310, 311, 381/123; 455/41.1, 41.2, 403; 700/94
See application file for complete search history.

(56) References Cited

U.S. PATENT DOCUMENTS

| 10,095,306 | B2* | 10/2018 | Welti ................. G02B 27/0093 |
| 11,115,773 | B1* | 9/2021 | Satongar .................. H04R 5/04 |
| 2010/0025216 | A1* | 2/2010 | Huang ..................... H01H 5/02 200/344 |
| 2016/0363992 | A1 | 12/2016 | Welti |
| 2018/0091922 | A1 | 3/2018 | Satongar et al. |
| 2023/0199366 | A1* | 6/2023 | Kim ........................ G06F 3/01 381/58 |

OTHER PUBLICATIONS

Dada, "What do Sony and other TWS think of AirPods' new playing method in space audio," WWDC 20, Shenzhen Bay (Jun. 23, 2020).
Anonymous : "Inertiale Messeinheit-Wikipedia", May 16, 2021 (May 16, 2021), XP093201927.

* cited by examiner

*Primary Examiner* — Vivian C Chin
*Assistant Examiner* — Con P Tran
(74) *Attorney, Agent, or Firm* — Volpe Koenig

(57) ABSTRACT

An audio signal processing method, includes: acquiring first rotation information when a wearable device rotates and second rotation information when a mobile device connected to the wearable device rotates; determining relative position information between the wearable device and the mobile device according to the first rotation information and the second rotation information; and processing an audio signal based on the relative position information to obtain a playing audio played by the wearable device.

13 Claims, 4 Drawing Sheets

AUDIO SIGNAL PROCESSING METHOD, ELECTRONIC APPARATUS, AND STORAGE MEDIUM

The present application is proposed based on a Chinese patent application No. 202110901591.X filed on Aug. 6, 2021, and claims priority to the Chinese patent application, the content of which is incorporated herein in its entirety.

BACKGROUND ART

Spatial audio, also known as surround audio, refers to surround sound channels that are placed precisely in appropriate positions, so that a user can immersively feel the surround sound experience by turning his/her head.

SUMMARY

The disclosure relates to the technical field of spatial audio, in particular to an audio signal processing method, electronic apparatus, and storage medium.

In the first aspect, an embodiment of the disclosure provides an audio signal processing method, including:
  acquiring first rotation information when a wearable device rotates and second rotation information when a mobile device connected to the wearable device rotates;
  determining relative position information between the mobile device and the wearable device according to the first rotation information and the second rotation information; and
  processing an audio signal based on the relative position information to obtain a playing audio played by the wearable device.

In the second aspect, an embodiment of the disclosure provides an electronic device, including:
  a processor; and
  a memory, storing computer instructions readable by the processor; when the computer instructions are read, the processor is configured to:
  acquire first rotation information when a wearable device rotates and second rotation information when a mobile device connected to the wearable device rotates;
  determine relative position information between the mobile device and the wearable device according to the first rotation information and the second rotation information; and
  process an audio signal based on the relative position information to obtain a playing audio played by the wearable device.

In the third aspect, an embodiment of the disclosure provides a storage medium used for storing the computer-readable instructions; and the computer-readable instructions are used for enabling a computer to execute an embodiment of the disclosure provides an audio signal processing method, including:
  acquiring first rotation information when a wearable device rotates and second rotation information when a mobile device connected to the wearable device rotates;
  determining relative position information between the mobile device and the wearable device according to the first rotation information and the second rotation information; and
  processing an audio signal based on the relative position information to obtain a playing audio played by the wearable device.

BRIEF DESCRIPTION OF THE DRAWINGS

In order to explain the specific embodiments of the disclosure or the technical solutions in the related art more clearly, the accompanying drawings to be used in describing the specific embodiments or the related art will be briefly introduced below. Obviously, the accompanying drawings described below are only some embodiments of the disclosure. For those or ordinary skill in the art, other drawings can also be obtained based on these accompanying drawings without making creative efforts.

DETAILED DESCRIPTION OF THE EMBODIMENTS

The technical solution of the disclosure will be clearly and completely described below in combination with the accompanying drawings. The described embodiments are only parts of, rather than all of, the embodiments of the disclosure. Based on the embodiments of the disclosure, all the other embodiments obtained by those of ordinary skill in the art without making creative efforts will fall within the protection scope of the disclosure. In addition, the technical features described below and involved in different embodiments of the disclosure can be combined with each other, as long as there is no conflict.

At present, some manufacturers have introduced spatial audio technology into Bluetooth headphones. By installing an inertial measurement unit such as gyroscope and accelerometer in a headphone for calculation, a rotation angle of the headphone can be obtained to realize the tracking of a wearer's head. When the wearer's head rotates, a sound source can be remapped, so that the sound source heard by the wearer is kept in a fixed position to achieve a spatial surround audio effect.

In a related art, when the spatial audio effect is realized, the position of an imaginary sound source is fixed, but a mobile terminal is different from the sound source device (such as a TV set) in the fixed position. In an actual scenario, when a user watches a video while holding a mobile device, the mobile device will rotate along with the head of the body, owing to the fixed position of the sound source, the user will subjectively perceive that the direction of the sound source remains at the original position, resulting in poorer use experience.

Based on the existing defects in the related art, the embodiments of the disclosure provide an audio signal processing method and device, an electronic device and a storage medium, in order to improve a spatial audio effect and user experience of a wearable device.

Figure 1:
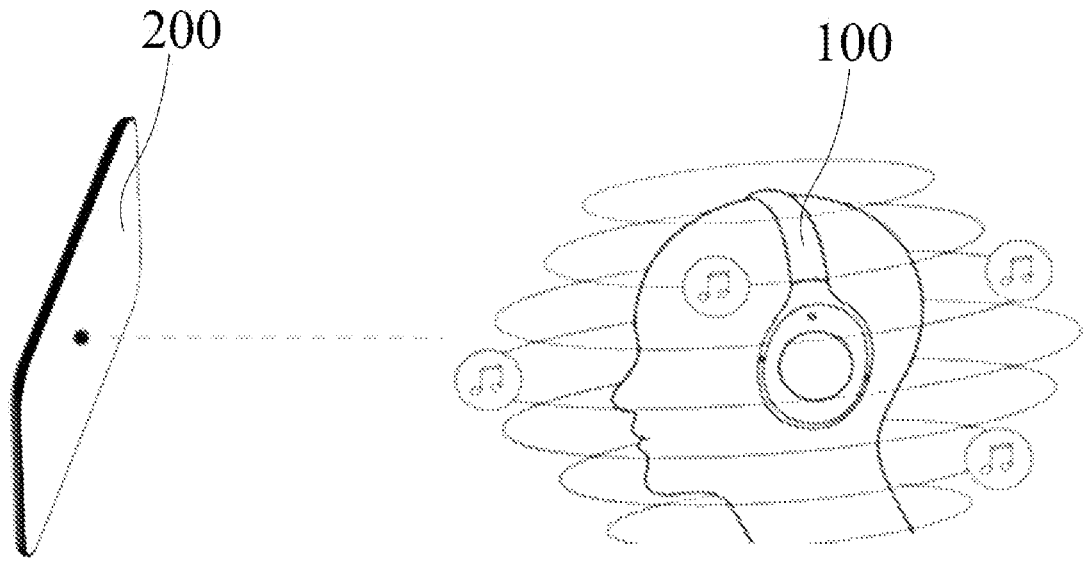
FIG. 1 is a schematic diagram of an application scenario in some embodiments of the disclosure.

Firstly, FIG. 1 shows a schematic diagram in some embodiments of the disclosure. As shown in FIG. 1, a system of an embodiment of the disclosure includes a wearable device 100 and a mobile device 200.

The wearable device 100 can be any device applicable for playing audio, and the wearable device can be worn on a human body to have angular deflection with movements of a user's limbs. In some embodiments, the wearable device 100 can be a headphone, a true wireless stereo (TWS) headphone, etc.

The mobile device 200 can be any mobile device applicable for generating sound sources, the mobile device 200 can send audio signals to the wearable device 100, and the mobile device 200 has the portability, such as a mobile phone, a tablet computer, a music player and a smart wearable device.

In an embodiment of the disclosure, a wireless communication module is arranged on both of the wearable device 100 and the mobile device 200, respectively, and it is used for creating communication connection between the two devices, in order to realize data transmission between them. The wireless communication module includes, but is not limited to, a Bluetooth transmission module and a WiFi transmission module. the wearable device 100 and the mobile device 200 can also create communicable connection in a wired manner, which is not limited by the disclosure.

An angle measurement unit and an inertial measurement unit are arranged in both the wearable device 100 and the mobile device 200, respectively. The angle measurement unit can be used for detecting position and posture changes of the device itself to obtain relevant information generated by the rotation of the device. For example, the angle measurement unit includes a triaxial gyroscope, an accelerometer, etc. The inertial measurement unit, also known as IMU, is a high-precision inertial sensor used for detecting a position and a posture change of the device itself and resolving the position and posture information of the device according to a relevant inertial navigation algorithm.

Figure 2:
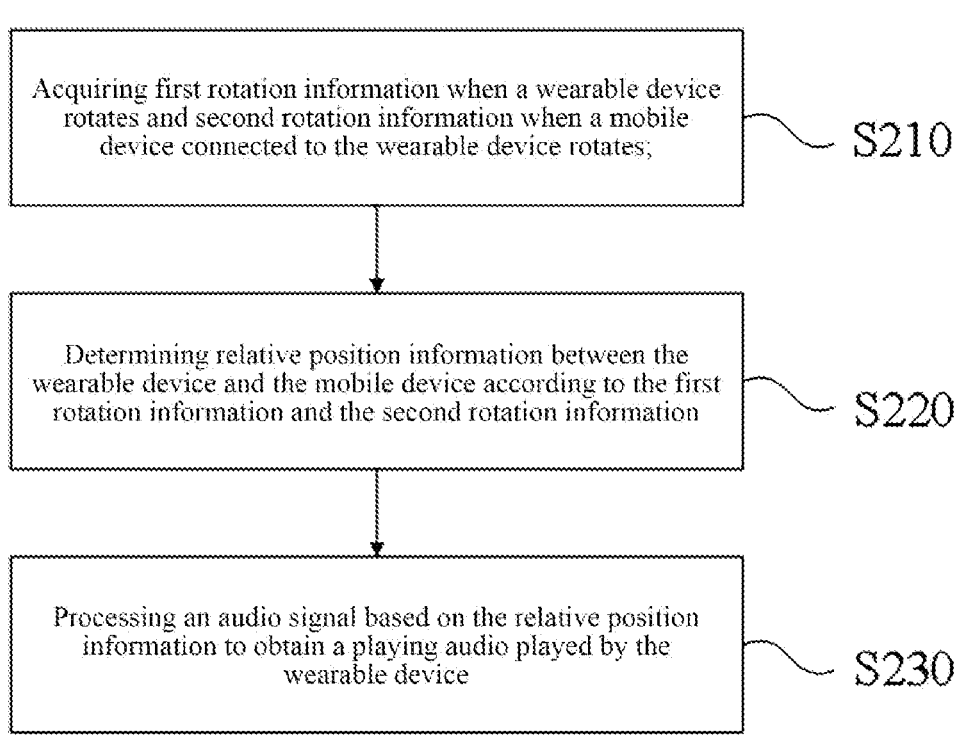
FIG. 2 is a flow chart of an audio signal processing method in some embodiments of the disclosure.

FIG. 2 shows an audio signal processing method in some embodiments of the disclosure, and the method can be applied in a system scenario as shown in FIG. 1. In some embodiments, considering that the operational capability of the mobile device 200 is often stronger than that of the wearable device 100, and thus the method of the disclosure can be performed and processed by a processor of the mobile device 200. However, those skilled in the art can understand that the method of the disclosure can also be performed and processed by a processor of the wearable device 100, or jointly performed and processed by the mobile device 200 and the wearable device 100, which is not limited by the disclosure.

As shown in FIG. 2, in some embodiments, an audio signal processing method of the disclosure includes:

At step S210, acquiring first rotation information when a wearable device rotates and second rotation information when a mobile device connected to the wearable device rotates is performed.

Taking a scenario as shown in FIG. 1 as an example, a user wears the wearable device 100 to watch a video played on the mobile device 200, and the mobile device 200 sends a playing audio to the wearable device 100, so that the user can hear the playing audio through the wearable device 100.

In a scenario, when a user rotates his head horizontally, the wearable device 100 rotates along with the head of the human body; at this time, the angle measurement unit and the inertial measurement unit in the wearable device 100 can detect the rotation of the wearable device 100 and generate corresponding measurement signals according to the position and posture angular changes during the rotation. The measurement signal can be sent by the wearable device 100 to the mobile device 200, and the mobile device 200 calculates the rotation information of the wearable device 100 according to the measurement signals. The corresponding rotation information can also be obtained through processing by a processor of the wearable device 100.

In another scenario, when the mobile device 200 (sound source) rotates horizontally; for example, it rotates from a position directly facing a user to the left front of the user. At this time, the angle measurement unit and the inertial measurement unit in the mobile device 200 can detect the rotation of the mobile device 200 and generate corresponding measurement signals according to the position and posture angular changes during the rotation. The measurement signals can be processed by a processor of the mobile device 200. The measurement signals can also be sent by the mobile device 200 to the wearable device 100, and the wearable device 100 calculates the rotation information of the mobile device 200 according to the measurement signals.

In another scenario, the mobile device 200 and the wearable device 100 rotate at the same time, and then the angle measurement units and the inertial measurement units in the mobile device 200 and the wearable device 100 can detect the respective position and posture angular changes to obtain their own corresponding rotation information.

In the embodiment of the disclosure, for convenience of understanding, the rotation information corresponding to the rotation of the wearable device 100 is defined as the "first rotation information", and the rotation information corresponding to the rotation of the mobile device 200 is defined as the "second rotation information".

It is worth noting that both the angle measurement unit and the inertial measurement unit can be used for detecting the position and posture angular changes of a device; however, in a complicated scenario that the device has an angular change in a triaxial direction, it is difficult to directly obtain the position and posture angular changes of the device using the angle measurement unit, and it is necessary to resolve the measurement signals of the inertial measurement unit based on the inertial navigation algorithm to obtain the position and posture angular changes of the device.

Therefore, for the condition of the rotation of the wearable device 100 or the mobile device 200, when the device rotates in a uniaxial direction, for example, the wearable device 100 rotates along with the head of a human body horizontally in a uniaxial direction, the first measurement signal of the angle measurement unit can be acquired, and then the first rotation information of the wearable device 100 is obtained according to the first measurement signal. For another example, the mobile device 200 rotates around the head of a human body horizontally in a uniaxial direction, the first measurement signal of the angle measurement unit can be acquired, and then the second rotation information of the mobile device 200 is obtained according to the first measurement signal.

It can be understood that under the condition of uniaxial rotation of a device, the corresponding rotation information can be directly obtained using the angle measurement unit, which simplifies a computing process and improves the processing efficiency.

In case of complicated movement of multiaxial rotation of a device, for example, the wearable device 100 rotates along with the head of a human body in triaxial directions including horizontally, vertically and in a front-back direction, it is difficult to obtain the position and posture angular changes using the angle measurement unit, at this time, the second measurement information of the inertial measurement unit can be acquired, and then the first rotation information for the rotation of the wearable device 100 is obtained by resolving based on the inertial navigation algorithm. For another example, when the mobile device 200 rotates in triaxial directions, the second measurement signal of the inertial measurement unit can be acquired similarly, and the second rotation information of the mobile device 200 is obtained based on the inertial navigation algorithm.

It can be understood that under the condition of multiaxial rotation of a device, the corresponding rotation information can be obtained through resolving by the angle measurement unit, which improves the detection efficiency under the condition of complicated movement of the device.

In addition, it is worth noting that the acquiring first rotation information and second rotation information in the embodiment of the disclosure does not mean that the wearable device 100 and the mobile device 200 must rotate at the same time. Neither can rotate; either one can rotate; or both can rotate at the same time. The embodiment of the disclosure is a process of real-time detection. It can be understood that when the device does not rotate, the corresponding rotation information can be zero or unchanged.

At step S220, determining relative position information between the wearable device and the mobile device according to the first rotation information and the second rotation information is performed.

In the embodiment of the disclosure, a playing audio is remapped according to the relative position information between the wearable device 100 and the mobile device 200, rather than the position and posture angular changes of the wearable device 100, thus avoiding the defect that a sound source is unmatched with an actual position of the device caused by a fixed sound source.

Specifically, after obtaining the first rotation information of the wearable device 100 and the second rotation information of the mobile device 200, the relative position information between the wearable device 100 and the mobile device 200 can be determined according to the first rotation information and the second rotation information.

The relative position information represents relative position and posture angle information between the wearable device 100 and the mobile device 200. For example, in a scenario, when the user wearing the wearable device 100 faces the mobile device 200 in an initial position, the user's head rotates by 30° to the right horizontally, and simultaneously the mobile device 200 is rotated by 20° to the left. At this time, the relative position information between the wearable device 100 and the mobile device 200 is the position and posture angle difference between the them, that is, 30°−(−20°)=50°.

In the embodiments of the disclosure, two processes of determining the relative position information between the wearable device 100 and the mobile device 200 are given.

In one example, when the wearable device 100 or the mobile device 200 rotates in a uniaxial direction, the wearable device 100 and the mobile device 200 have angular velocities in the direction of rotation. The angle measurement unit on the wearable device 100 can measure the first angular velocity ω1 when the wearable device 100 rotates, and the angle measurement device on the mobile device 200 can measure the second angular velocity ω2 when the mobile device 200 rotates.

The relative position information between the wearable device 100 and the mobile device 200 can be obtained by integrating in a time domain according to a difference value between the first angular velocity and the second angular velocity, expressed as:

$$\Delta\alpha(T)=\int_0^T(\omega 1(t)-\omega 2(t))dt$$

where, $\Delta\alpha(T)$ is the position and posture angle difference between the wearable device 100 and the mobile device 200 at time T, that is, the relative position information in the embodiment of the disclosure.

In another example, when the wearable device 100 or the mobile device 200 rotates in multiaxial directions, the first azimuth angle for the rotation of the wearable device 100 can be obtained by resolving according to the measurement signal of the inertial measurement unit of the wearable device 100 based on the inertial navigation algorithm; meanwhile, the second azimuth angle for the rotation of the mobile device 200 is obtained by resolving according to the measurement signal of the inertial measurement unit of the mobile device 200 based on the inertial navigation algorithm. Therefore, the difference value between the first azimuth angle and the second azimuth angle is the position and posture angle difference between the wearable device 100 and the mobile device 200, that is, the relative position information in the embodiment of the disclosure.

At step S230, processing an audio signal based on the relative position information to obtain a playing audio played by the wearable device is performed.

HRTF (Head Related Transfer Functions) is an audio localization algorithm; in the existing applications, based on tracking the movements of a user's head, a sound source can be remapped using the HRTF, so that the headphone can produce various spatial auditory effects. A basic principle of the HRTF can be considered as that an audio signal is processed by remapping based on different head-related parameters to obtain the playing audio of a corresponding auditory effect. The head-related parameters represent relative position and posture information between the mobile device and the wearable device.

Figure 3:
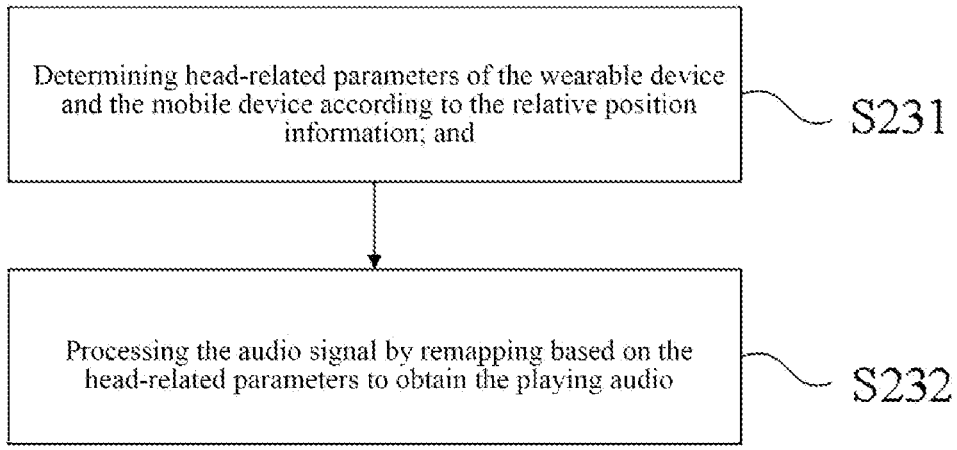
FIG. 3 is a flow chart of an audio signal processing method in some embodiments of the disclosure.

FIG. 3 shows a process of obtaining a playing audio according to relative position information in some embodiments of the disclosure, which will be specifically illustrated below in combination with FIG. 3.

As shown in FIG. 3, in some embodiments, an audio signal processing method of the disclosure includes:

Step S231, which is determining head-related parameters of the wearable device and the mobile device according to the relative position information; and Step S232, which is processing the audio signal by remapping based on the head-related parameters to obtain the playing audio.

Based on the above-mentioned principle, after the relative position information of the wearable device 100 and the mobile device 200 is determined, the head-related parameters between the wearable device 100 and the mobile device 200 can be determined according to the relative position information. For example, in an example, the head-related parameters include an angle difference between the azimuth angles of the wearable device 100 and the mobile device 200.

After the head-related parameters are determined, the audio signal transferred by the mobile device 200 can be remapped based on the HRTF algorithm, so as to obtain the processed playing audio. The mobile device 200 can send the processed playing audio to the wearable device 100, and the wearable device 100 will play it, so that the user can hear the spatial surround audio effect.

It is worth noting that, in the embodiments of the disclosure, the relative position information represents the relative positional relationship between the wearable device 100 and the mobile device 200. Different from the solution in the related art in which an imaginary sound source is in a fixed position, in the embodiments of the disclosure, the relative positional relationship between the wearable device 100 and the mobile device 200 is used for remapping an audio signal. For example, as shown in FIG. 1, when the user rotates while holding the mobile device 200 in his hand, that is, the mobile device 200 and the wearable device 100 are simultaneously rotated, although the wearable device 100 has position and posture changes, the relative position and posture angle between the mobile device 200 and the wearable device 100 remains unchanged; therefore, the remapped sound source in the embodiment of the disclosure can still be kept directly front of the user, so that the auditory position of the sound source is kept consistent with the actual position, improving the auditory experience.

In addition, it is worth noting that in some embodiments of the disclosure, the relative position information between the wearable device 100 and the mobile device 200 is represented by the angle difference of their azimuth angles. This is because, for the wearable device 100 and the mobile device 200, there are small changes in their positions and postures, and the traditional inertial navigation technology is less observable in such small position and posture changes, and it is difficult to solve the position and posture information with high accuracy. If the relative positional relationship between the wearable device and the mobile device is calculated directly by using their position information, the error is too large to apply. Therefore, in some embodiments of the disclosure, the relative position information between the wearable device and the mobile device is expressed based on the angle difference of their azimuth angles, so as to improve the detection accuracy.

Based on the above descriptions and in the embodiments of the disclosure, the audio signal is processed based on the relative position information between the wearable device and the mobile device to realize the spatial surround audio, improving the audio playing effect. Compared with the solution of fixed position of a sound source in the related art, the disclosure is more applicable for the scenario of mobile devices to avoid the defect that the position of a sound source is inconsistent with the actual position of a mobile device in case of a position change of the device, improving the user experience. The relative position information between the wearable device and the mobile device is represented based on the angle difference of their azimuth angles, improving the detection accuracy.

In some embodiments, in an audio signal processing method of the disclosure, a corresponding trigger switch can be arranged on the mobile device 200 or the wearable device 100, and a user can manually turn on/off the trigger switch to implement and disable the above process.

In an example, a corresponding trigger switch can be arranged on a video playing interface of the mobile device, and the trigger switch can be present when a user wears the wearable device. In this way, when the user wears the wearable device 100 to watch a video playing on the mobile device 200, the trigger switch can be manually turned on. The mobile device 200 can detect a state of the trigger switch, and when it is detected that the trigger switch is on, the above audio signal processing process can be performed.

In other embodiments, the trigger switch can also be arranged on the wearable device 100, and the trigger switch can be either a virtual touch switch on the mobile device or the wearable device, or a real physical button, which is not limited in the disclosure.

In some embodiments, the wearable device 100 of an example of the disclosure can include TWS earphones or a headset, and the mobile device can include a smartphone. The smartphone can send an audio signal to the headphone, and the headphone plays the corresponding playing audio.

In an example, as shown in FIG. 1, the user wearing the wearable device 100 in his hand faces the mobile device 200 and watches a video, the user manually turns on the trigger switch on the mobile device 200, and the position where the user turns on the trigger switch is the initial position. When the user rotates his head by 30° to the right, the wearable device 100 rotates by 30° to the right from the initial position along with the user's head. At the same time, the user's hand rotates the mobile device 200 to the right by 15°.

In this case, the angle measurement unit of the wearable device 100 detects the rotation of the device, and the first rotation information of the wearable device 100 is obtained as "rotate to the right by 30°" according to the measurement signal. Similarly, the angle measurement unit of the mobile device 200 detects the rotation of the device, and the second rotation information of the mobile device 200 is obtained as "rotate to the right by 15°" according to the measurement signal.

The mobile device 200 receives the first rotation information sent by the wearable device 100, the relative position information is obtained as "the mobile device is at 15° in the left front of the wearable device" after processing the first rotation information and the second rotation information; then the corresponding head-related parameters are obtained according to the relative position information, an audio signal is remapped according to the head-related parameters and then sent to the wearable device, and the wearable device emits the processed playing audio through a receiver, so that the user can hear the audio with a spatial surround effect.

It can be known from the above descriptions that in the embodiments of the disclosure, the audio signal is processed based on the relative position information between the wearable device and the mobile device to realize the spatial surround audio, improving the audio playing effect. Compared with the solution of fixed position of a sound source in the related art, the disclosure is more applicable for the scenario of mobile devices to avoid the defect that the position of a sound source is inconsistent with the actual position of a mobile device in case of a position change of the device, improving the user experience. Relative position information between the wearable device and the mobile device is represented based on the angle difference of their azimuth angles, improving the detection accuracy.

In some embodiments, considering that the operational capability of the mobile device 200 is often stronger than that of the wearable device 100, and thus the processing steps of the method in the above embodiment can be performed and processed by a processor of the mobile device 200. This will be illustrated below in combination with FIG. 4.

Figure 4:
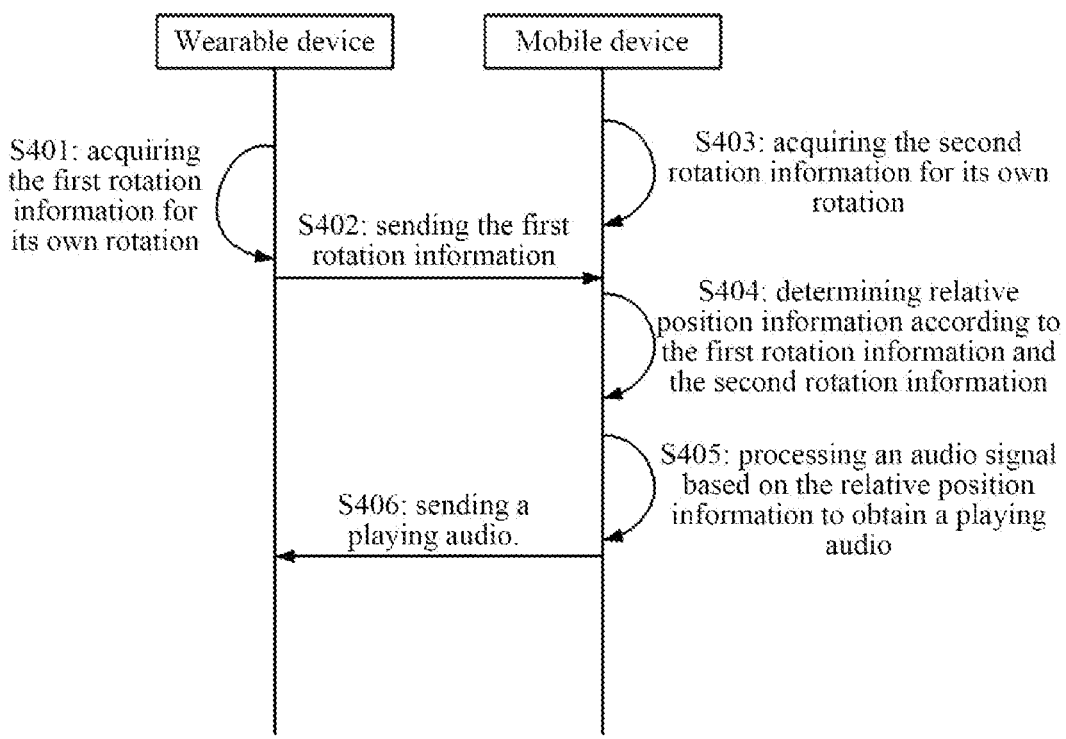
FIG. 4 is a flow chart of an audio signal processing method in some embodiments of the disclosure.

As shown in FIG. 4, in some embodiments, an audio signal processing method of the disclosure includes:

Step S401, in which the wearable device acquires the first rotation information for its own rotation.

Specifically, in a scenario, when a user rotates his head horizontally, the wearable device 100 rotates along with the head of the human body; at this time, the angle measurement unit and the inertial measurement unit in the wearable device 100 can detect the rotation of the wearable device 100 and generate corresponding measurement signals according to the position and posture angular changes during the rotation, and the wearable device 100 obtains the first rotation information by processing the measurement signals.

Step S402, in which the wearable device sends the first rotation information to the mobile device.

In an example, the wearable device 100 and the mobile device 200 can create wireless communication connection through a Bluetooth module, so that the wearable device 100 can send the first rotation information to the mobile device 200 through the Bluetooth module.

Step S403, in which the mobile device acquires the second rotation information for its own rotation.

Specifically, in a scenario, when the mobile device 200 rotates horizontally, for example, it rotates from a position directly facing a user to the left front of the user; at this time, the angle measurement unit and the inertial measurement unit in the mobile device 200 can detect the rotation of the mobile device 200 and generate corresponding measurement signals according to the position and posture angular changes during the rotation, and the mobile device 200 obtains the second rotation information by processing the measurement signals.

Step S404, in which the mobile device determines relative position information between the wearable device and the mobile device according to the first rotation information and the second rotation information Specifically, after the mobile device 200 obtains the first rotation information of the wearable device 100 and the second rotation information of the mobile device 200, the relative position information between the wearable device 100 and the mobile device 200 can be obtained according to the first rotation information and the second rotation information. The specific process can refer to the previously described embodiment, which will not be repeated again.

Step, S405, in which the mobile device processes an audio signal based on the relative position information to obtain a playing audio.

Specifically, after obtaining the relative position information, the mobile device 200 can remap the audio signal in accordance with the process in the previously described embodiment to obtain the playing audio. The specific process can refer to the previously described embodiment, which will not be repeated again.

Step S406, in which the mobile device sends the playing audio to the wearable device.

In an example, the wearable device 100 and the mobile device 200 can create wireless communication connection through a Bluetooth module, so that the mobile device 200 can send the playing audio to the wearable device 100 through the Bluetooth module. The wearable device receiving the playing audio can play the audio through the receiver, so that the user can hear the playing audio with a spatial surround effect.

Based on the above descriptions and the embodiments of the disclosure, the mobile device is used for data processing, and thus the method with a lower requirement for the operational capability of the wearable device is applicable for various wearable devices.

In some embodiments, the processing steps of the method in the above embodiment of the disclosure can be performed and processed by a processor of the wearable device 100. This will be illustrated below in combination with FIG. 5.

Figure 5:
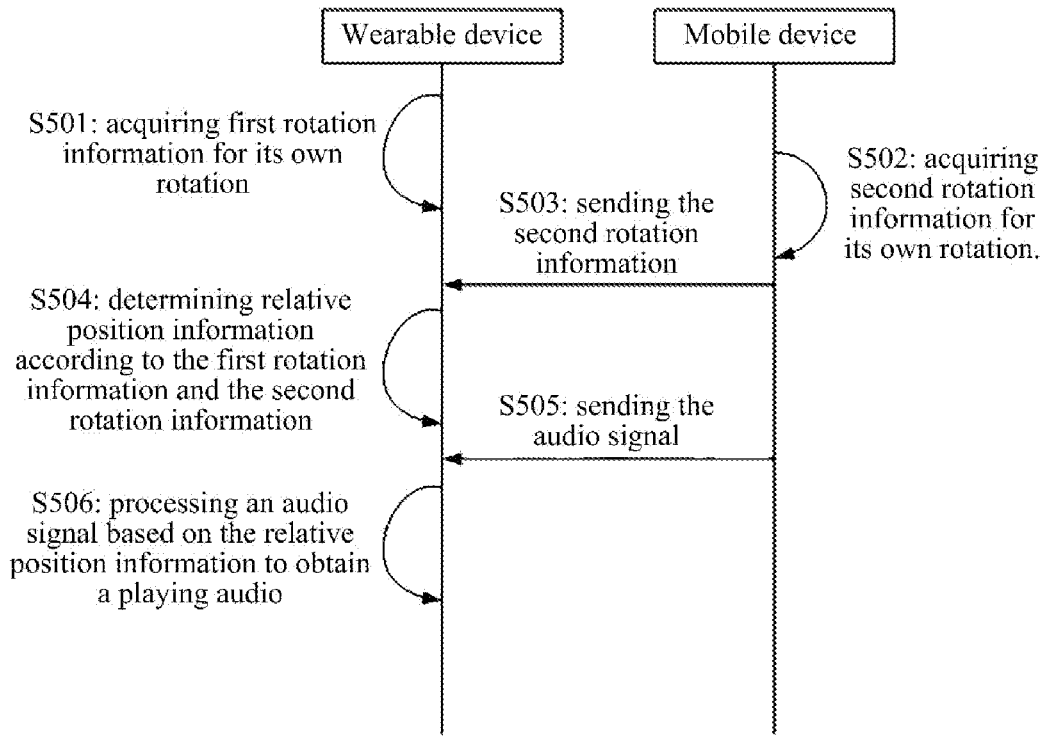
FIG. 5 is a flow chart of an audio signal processing method in some embodiments of the disclosure.

As shown in FIG. 5, in some embodiments, an audio signal processing method of the disclosure includes:

Step S501, in which the wearable device acquires the first rotation information for its own rotation.

Specifically, in a scenario, when a user rotates his head horizontally, the wearable device 100 rotates along with the head of the human body; at this time, the angle measurement unit and the inertial measurement unit in the wearable device 100 can detect the rotation of the wearable device 100 and generate corresponding measurement signals according to the position and posture angular changes during the rotation, and the wearable device 100 obtained the first rotation information by processing the measurement signals.

Step S502, in which the mobile device acquires the second rotation information for its own rotation.

Specifically, in a scenario, when the mobile device 200 rotates horizontally, for example, it rotates from a position directly facing a user to the left front of the user; at this time, the angle measurement unit and the inertial measurement unit in the mobile device 200 can detect the rotation of the mobile device 200 and generate corresponding measurement signals according to the position and posture angular changes during the rotation, and the mobile device 200 obtains the second rotation information by processing the measurement signals.

Step S503, in which the mobile device sends the second rotation information to the wearable device.

In an example, the wearable device 100 and the mobile device 200 can create wireless communication connection through a Bluetooth module, so that the mobile device 200 can send the second rotation information to the wearable device 100 through the Bluetooth module.

Step S504, in which the wearable device determines relative position information between the wearable device and the mobile device according to the first rotation information and the second rotation information.

Specifically, after the wearable device 100 obtains the second rotation information sent by the mobile device 200 and its own first rotation information, the relative position information between the wearable device 100 and the mobile device 200 can be obtained according to the first rotation information and the second rotation information. The specific process can refer to the previously described embodiment, which will not be repeated again.

Step S505, in which the wearable device receives an audio signal sent by the mobile device.

In an example, the wearable device 100 and the mobile device 200 can create wireless communication connection through a Bluetooth module, so that the mobile device 200 can send the audio signal to the wearable device 100 through the Bluetooth module.

Step S506, in which the wearable device processes an audio signal based on the relative position information to obtain a playing audio.

Specifically, after obtaining the relative position information, the wearable device 100 can remap the received audio signal in accordance with the process in the previously described embodiment to obtain the playing audio. The specific process can refer to the previously described embodiment, which will not be repeated again.

After obtaining the processed playing audio, the wearable device 100 can play the audio through the receiver, so that the user can hear the playing audio with a spatial surround effect.

Based on the above descriptions and the embodiments of the disclosure, the wearable device is used for data processing, and thus the method with a lower requirement for the operational capability of the mobile device is applicable for various mobile devices.

It can be understood that, the above-mentioned steps of the embodiment of the disclosure can also be jointly executed and processed by the wearable device and the mobile device, those skilled in the art can understand this, and thus it will not be repeated again in the disclosure.

Figure 6:
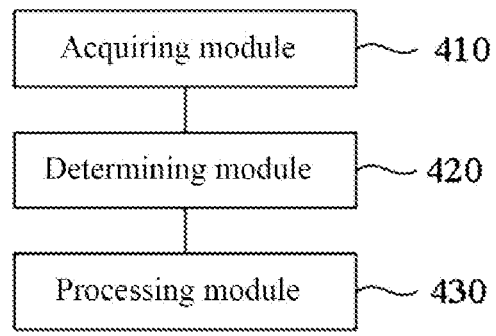
FIG. 6 is a structure diagram of an audio signal processing device in some embodiments of the disclosure.

An embodiment of the disclosure provides an audio signal processing device, as shown in FIG. 6, and in some embodiments, an audio signal processing device of the disclosure includes:

an acquiring module 410, configured to acquire the first rotation information when the wearable device rotates and the second rotation information when the mobile device connected to the wearable device rotates;

a determining module 420, configured to determine the relative position information between the mobile device and the wearable device according to the first rotation information and the second rotation information; and a processing module 430, configured to process an audio signal based on the relative position information to obtain a playing audio played by the wearable device.

Based on the above descriptions and the embodiments of the disclosure, the audio signal is processed based on the relative position information between the wearable device and the mobile device to realize the spatial surround audio, improving the audio playing effect. Compared with the solution of fixed position of a sound source in the related art, the disclosure is more applicable for the scenario of mobile devices to avoid the defect that the position of a sound source is inconsistent with the actual position of a mobile device in case of a position change of the device, improving the user experience.

In some embodiments, the acquiring module 410 is specifically configured to:

acquire a first measurement signal of an angle measurement unit of the wearable device, and obtain the first rotation information according to the first measurement signal;

and/or acquire a second measurement signal of an inertial measurement unit of the wearable device, and obtain the first rotation information by resolving according to the second measurement signal.

In some embodiments, the acquiring module 410 is specifically configured to:

acquire a first measurement signal of an angle measurement unit of the mobile device, and obtain the second rotation information according to the first measurement signal;

and/or acquire a second measurement signal of an inertial measurement unit of the mobile device, and obtain the second rotation information according to the second measurement signal.

In some embodiments, the first rotation information includes a first angular velocity when the wearable device rotates, and the second rotation information includes a second angular velocity when the mobile device rotates; and the determining module 420 is specifically configured to:

obtain the relative position information by integrating in a time domain according to a difference value between the first angular velocity and the second angular velocity.

In some embodiments, the first rotation information includes a first azimuth angle after the wearable device rotates, and the second rotation information includes a second azimuth angle after the mobile device rotates; and the determining module 420 is specifically configured to:

obtain the relative position information by a difference value between the first azimuth angle and the second azimuth angle.

In some embodiments, the processing module 430 is specifically configured to:

determine head-related parameters of the wearable device and the mobile device according to the relative position information; and process the audio signal by remapping based on the head-related parameters to obtain the playing audio.

In some embodiments, the audio signal processing device of the disclosure also includes:

a detecting module, configured to detect a state of a trigger switch on the mobile device, and acquire first rotating information and second rotating information in response to turn-on of the trigger switch.

Based on the above descriptions and the embodiments of the disclosure, the audio signal is processed based on the relative position information between the wearable device and the mobile device to realize the spatial surround audio, improving the audio playing effect. Compared with the solution of fixed position of a sound source in the related art, the disclosure is more applicable for the scenario of mobile devices to avoid the defect that the position of a sound source is inconsistent with the actual position of a mobile device in case of a position change of the device, improving the user experience. Relative position information between the wearable device and the mobile device is represented based on the angle difference of their azimuth angles, improving the detection accuracy.

An embodiment of the disclosure provides an electronic device, including:

a processor; and a memory, storing computer instructions readable by the processor; when the computer instructions are read, the processor executes the method described in any of the above-mentioned embodiments.

An embodiment of the disclosure provides a storage medium used for storing the computer-readable instructions; and the computer-readable instructions are used for enabling a computer to execute the method described in any of the above-mentioned embodiments.

Figure 7:
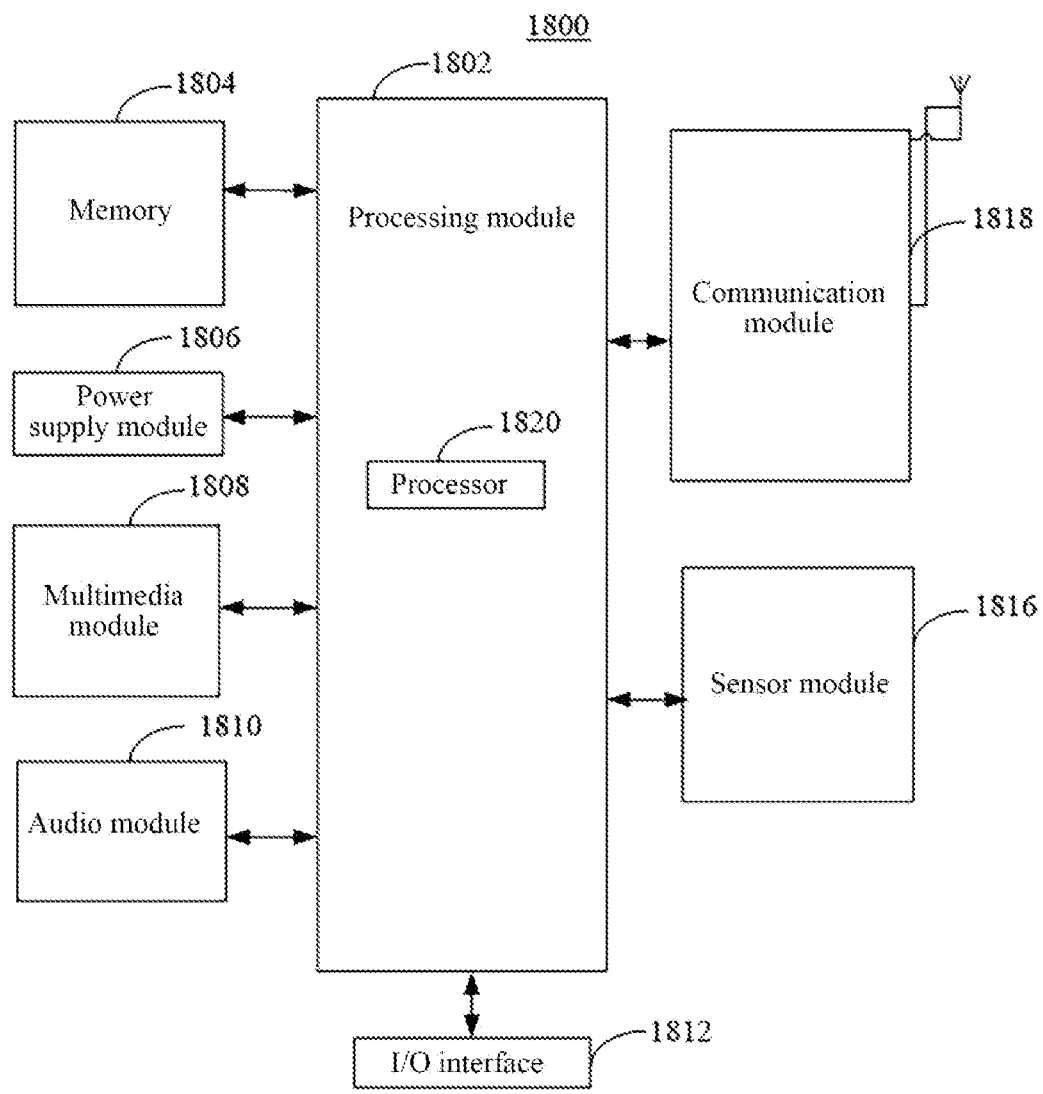
FIG. 7 is a structure diagram of an electronic device applicable for an audio signal processing method of the disclosure.

FIG. 7 shows a structure diagram of an electronic device in some embodiments of the disclosure, and relevant principles of the electronic device and the storage medium of some embodiments of the disclosure are illustrated below in combination with FIG. 7.

As shown in FIG. 7, an electronic device 1800 can include one or some of the following components: a processing module 1802, a memory 1804, a power supply module 1806, a multimedia module 1808, an audio module 1810, an input/output (I/O) interface 1812, a sensor module 1816 and a communication module 1818.

The processing module 1802 generally controls the overall operation of the electronic device 1800, such as operations associated with display, phone calls, data communications, camera operations and recording operations. The processing module 1802 can include one or more processors 1820 to execute instructions. In addition, the processing module 1802 can include one or more modules to facilitate interaction of the processing module 1802 with other components. For example, the processing module 1802 can include a multimedia module to facilitate interaction of the multimedia module 1808 with the processing module 1802. For another example, the processing module 1802 can read an executable instruction from the memory to implement related functions of the electronic device.

The memory 1804 is configured to store various data to support operations on the electronic device 1800. Examples of such data include instructions for any application or method operating on the electronic device 1800, contact data, phonebook data, messages, images, videos, etc. The memory 1804 can be implemented by any type of volatile or non-volatile storage device or a combination thereof, such as static random access memory (SRAM), electrically erasable programmable read-only memory (EEPROM), erasable programmable memory programmable read-only memory (EPROM), programmable read-only memory (PROM), read-only memory (ROM), magnetic memory, flash memory, magnetic disk or optical disk.

The power supply module 1806 provides power to various components of the electronic device 1800. The power supply module 1806 can include a power management system, one or more power supplies, and other components associated with generating, managing and distributing power to the electronic device 1800.

The multimedia module 1808 includes a display screen providing an output interface between the electronic device 1800 and a user. In some embodiments, the multimedia module 1808 includes a front camera and/or a rear camera. When the electronic device 1800 is in an operation mode, such as shooting mode or video mode, the front camera and/or the rear camera can receive external multimedia data. Each of the front camera and the rear camera can be a fixed optical lens system or have focal length and optical zooming capability.

The audio module 1810 is configured to output and/or input audio signals. For example, the audio module 1810 includes a microphone (MIC); when the electronic device 1800 is in an operation mode, such as call mode, record mode and voice recognition mode, the microphone is configured to receive an external audio signal. The received audio signal can be further stored in the memory 1804 or transmitted via the communication module 1818. In some embodiments, the audio module 1810 also includes a speaker for outputting audio signals.

The I/O interface 1812 provides an interface between the processing module 1802 and a peripheral interface module, which can be a keyboard, a click wheel or buttons. These buttons can include, but are not limited to, a home button, volume buttons, a start button and a lock button.

The sensor module 1816 includes one or more sensors for providing various aspects of status assessment for the electronic device 1800. For example, the sensor module 1816 can detect an on/off state of the electronic device 1800, and the relative positioning of components, which can be a display and a keypad of the electronic device 1800; the sensor module 1816 can also detect the position change of the electronic device 1800 or a component of the electronic device 1800, the presence or absence of user contact with the electronic device 1800, the direction or acceleration/deceleration of the electronic device 1800, and a change in the temperature of the electronic device 1800. The sensor module 1816 can include a proximity sensor configured to detect the presence of nearby objects in the absence of any physical contact. The sensor module 1816 can also include a light sensor, such as CMOS or CCD image sensor, which is used in an imaging application. In some embodiments, the sensor module 1816 can also include an acceleration sensor, a gyroscope sensor, a magnetic sensor, a pressure sensor or a temperature sensor.

The communication module 1818 is configured to facilitate wired or wireless communication between the electronic device 1800 and other devices. The electronic device 1800 can be accessed to a wireless network based on a communication standard, such as Wi-Fi, 2G, 3G, 4G, 5G or 6G, or a combination thereof. In one embodiment, the communication module 1818 receives broadcast signals or broadcast related information from an external broadcast management system via a broadcast channel. In an embodiment, the communication module 1818 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the electronic device 1800 can be implemented by one or more application specific integrated circuits (ASICs), a digital signal processor (DSP), a digital signal processing device (DSPD), a programmable logic device (PLD), a field programmable gate array (FPGA), a controller, a micro-controller, a microprocessor or other electronic components.

It is obvious that, the above-mentioned embodiments are only examples for clear illustration, rather than limitation of the embodiments. For those of ordinary skills in the art, other different forms of changes or modifications can also be obtained on the basis of the above illustrations. It is unnecessary and also unable to list all the embodiments. The obvious changes or variations derived will still fall within the protection scope of the disclosure.

What is claimed is:

1. An audio signal processing method, comprising the following steps:
   acquiring first rotation information when a wearable device rotates and second rotation information when a mobile device connected to the wearable device rotates;
   determining relative position information between the mobile device and the wearable device according to the first rotation information and the second rotation information; and
   processing an audio signal based on the relative position information to obtain a playing audio played by the wearable device;
   wherein the first rotation information comprises a first angular velocity when the wearable device rotates, and the second rotation information comprises a second angular velocity when the mobile device rotates; and the step of determining relative position information between the mobile device and the wearable device according to the first rotation information and the second rotation information comprises the following specific step:
   obtaining the relative position information by integrating in a time domain according to a difference value between the first angular velocity and the second angular velocity;
   wherein the step of acquiring first rotation information when the wearable device rotates comprises the following steps:
   acquiring a first measurement signal of an angle measurement unit of the wearable device, and
   obtaining the first rotation information according to the first measurement signal;
   wherein the step of acquiring second rotation information when the mobile device rotates comprise the following steps:
   acquiring a first measurement signal of an angle measurement unit of the mobile device, and
   obtaining the second rotation information according to the first measurement signal.

2. The method of claim 1, wherein the first rotation information comprises a first azimuth angle after the wearable device rotates, and the second rotation information comprises a second azimuth angle after the mobile device rotates; and the step of determining relative position information between the mobile device and the wearable device according to the first rotation information and the second rotation information comprises the following specific step:
obtaining the relative position information by a difference value between the first azimuth angle and the second azimuth angle.

3. The method of claim 1, wherein the step of processing an audio signal based on the relative position information to obtain a playing audio played by the wearable device comprises the following steps:
determining head-related parameters of the wearable device and the mobile device according to the relative position information; and
processing the audio signal by remapping based on the head-related parameters to obtain the playing audio.

4. The method of claim 1, wherein before the step of acquiring first rotation information when the wearable device rotates and second rotation information when the mobile device connected to the wearable device rotates, the method also comprises:
detecting a state of a trigger switch on the mobile device, and executing the step of acquiring first rotating information and second rotating information in response to turn-on of the trigger switch.

5. The method of claim 1, wherein the step of acquiring first rotation information when the wearable device rotates comprises the following steps:
acquiring a second measurement signal of an inertial measurement unit of the wearable device, and obtaining the first rotation information by resolving according to the second measurement signal.

6. The method of claim 1, wherein the step of acquiring second rotation information when the mobile device rotates comprise the following steps:
acquiring a second measurement signal of an inertial measurement unit of the mobile device, and obtaining the second rotation information according to the second measurement signal.

7. An electronic device, comprising:
a processor; and
a memory, storing computer instructions readable by the processor; when the computer instructions are read, the processor is configured to:
acquire first rotation information when a wearable device rotates and second rotation information when a mobile device connected to the wearable device rotates;
determine relative position information between the mobile device and the wearable device according to the first rotation information and the second rotation information; and
process an audio signal based on the relative position information to obtain a playing audio played by the wearable device;
wherein the first rotation information comprises a first angular velocity when the wearable device rotates, and the second rotation information comprises a second angular velocity when the mobile device rotates; and the processor is further configured to:
obtain the relative position information by integrating in a time domain according to a difference value between the first angular velocity and the second angular velocity;

wherein the processor is further configured to:
acquire a first measurement signal of an angle measurement unit of the wearable device, and obtain the first rotation information according to the first measurement signal;
acquire a first measurement signal of an angle measurement unit of the mobile device, and obtain the second rotation information according to the first measurement signal.

8. The device according to claim 7, wherein the first rotation information comprises a first azimuth angle after the wearable device rotates, and the second rotation information comprises a second azimuth angle after the mobile device rotates; and the processor is further configured to:
obtain the relative position information by a difference value between the first azimuth angle and the second azimuth angle.

9. The device according to claim 7, wherein the processor is further configured to:
determine head-related parameters of the wearable device and the mobile device according to the relative position information; and
process the audio signal by remapping based on the head-related parameters to obtain the playing audio.

10. The device according to claim 7, wherein the processor is further configured to:
detect a state of a trigger switch on the mobile device, and executing the step of acquiring first rotating information and second rotating information in response to turn-on of the trigger switch.

11. The device according to claim 7, wherein the processor is further configured to:
acquire a second measurement signal of an inertial measurement unit of the wearable device, and obtaining the first rotation information by resolving according to the second measurement signal.

12. The device according to claim 7, wherein the processor is further configured to:
acquire a second measurement signal of an inertial measurement unit of the mobile device, and obtaining the second rotation information according to the second measurement signal.

13. A non-transitory computer readable storage medium, used for storing the computer-readable instructions; and the computer-readable instructions are used for enabling a computer to execute an audio signal processing method, comprising the following steps:
acquiring first rotation information when a wearable device rotates and second rotation information when a mobile device connected to the wearable device rotates;
determining relative position information between the mobile device and the wearable device according to the first rotation information and the second rotation information; and
processing an audio signal based on the relative position information to obtain a playing audio played by the wearable device;
wherein the first rotation information comprises a first angular velocity when the wearable device rotates, and the second rotation information comprises a second angular velocity when the mobile device rotates; and the step of determining relative position information between the mobile device and the wearable device according to the first rotation information and the second rotation information comprises the following specific step:

obtaining the relative position information by integrating in a time domain according to a difference value between the first angular velocity and the second angular velocity;

wherein the step of acquiring first rotation information when the wearable device rotates comprises the following steps:
  acquiring a first measurement signal of an angle measurement unit of the wearable device, and
  obtaining the first rotation information according to the first measurement signal;

wherein the step of acquiring second rotation information when the mobile device rotates comprise the following steps:
  acquiring a first measurement signal of an angle measurement unit of the mobile device, and
  obtaining the second rotation information according to the first measurement signal.

* * * * *